US 11,428,555 B2

(12) United States Patent
Chang et al.

(10) Patent No.: US 11,428,555 B2
(45) Date of Patent: Aug. 30, 2022

(54) SIGNAL PROCESSING CIRCUIT FOR PROCESSING SIGNALS FROM ULTRASONIC TRANSDUCERS TO OBTAIN DISTANCE BETWEEN TRANSDUCERS

(71) Applicant: SHENZHEN GOODIX TECHNOLOGY CO., LTD., Guangdong (CN)

(72) Inventors: Jung-Yu Chang, Guangdong (CN); Yen-Yin Huang, Guangdong (CN)

(73) Assignee: SHENZHEN GOODIX TECHNOLOGY, Guangdong (CN)

( * ) Notice: Subject to any disclaimer, the term of this patent is extended or adjusted under 35 U.S.C. 154(b) by 180 days.

(21) Appl. No.: 16/889,342

(22) Filed: Jun. 1, 2020

(65) Prior Publication Data
US 2020/0300678 A1 Sep. 24, 2020

Related U.S. Application Data

(63) Continuation of application No. PCT/CN2019/074368, filed on Feb. 1, 2019.

(51) Int. Cl.
G01F 1/66 (2022.01)
G01F 1/667 (2022.01)

(52) U.S. Cl.
CPC .............. G01F 1/667 (2013.01); G01F 1/662 (2013.01)

(58) Field of Classification Search
None
See application file for complete search history.

(56) References Cited

U.S. PATENT DOCUMENTS 5,650,571 A * 7/1997 Freud .................... G01S 15/10
73/861.28
7,073,395 B2 * 7/2006 Suginouchi ............ G01F 1/667
73/861.27
8,746,062 B2 * 6/2014 Stein .................... A61B 5/6846
600/587

(Continued)

FOREIGN PATENT DOCUMENTS

AU 2015221509 A1 9/2015
CN 102713531 A 10/2012

(Continued)

OTHER PUBLICATIONS

Rui', L., Bing', L., Jia', Y., & Ying, Z. (2017). Error Analysis and Countermeasure of Hardware Delay of Ultrasonic Flowmeter in Speed Difference Method. Instrument Technique and Sensor, No. 3 2017.

(Continued)

Primary Examiner — Harshad R Patel
(74) Attorney, Agent, or Firm — WPAT, P.C., Intellectual Property Attorneys; Anthony King

(57) ABSTRACT

The present application discloses a signal processing circuit (100), coupled to a first transducer (102) and a second transducer (104), wherein the first transducer and the second transducer have a distance greater than zero, and a fluid having a flow velocity flows sequentially through the first transducer and the second transducer, the signal processing circuit includes: a first transmitter (106), coupled to the first transducer; a first receiver (108), coupled to the first transducer; a second transmitter (110), coupled to the second transducer; a second receiver (112), coupled to the second transducer; and a control unit (114), coupled to the first transmitter, the first receiver, the second transmitter and the second receiver. The present application further provides a related chip, a flow meter and a method.

10 Claims, 5 Drawing Sheets

(56) References Cited

U.S. PATENT DOCUMENTS

2006/0016243 A1    1/2006   Nevius
2012/0272748 A1   11/2012   Yuji et al.
2021/0270647 A1*   9/2021   Xie ........................... G01F 1/74

FOREIGN PATENT DOCUMENTS

| CN | 106932040 A | 7/2017 |
| CN | 106932040 A | 7/2017 |
| CN | 108458759 A | 8/2018 |
| CN | 108458759 A | 8/2018 |
| JP | H06201425 A | 7/1994 |
| JP | 2011158470 A | 8/2011 |

OTHER PUBLICATIONS

English Abstract Translation of Foreign Reference CN102713531A.
English Abstract Translation of Foreign Reference CN106932040A.
English Abstract Translation of Foreign Reference CN108458759A.
International Searching Authority (ISA) Form 210—International Search Report of PCT/CN2019/074368.
International Searching Authority (ISA) Form 220—Notification of Transmittal of the International Search Report of PCT/CN2019/074368.
International Searching Authority (ISA) Form 237—Written Opinion of PCT/CN2019/074368.
As-filed PCT Request of PCT/CN2019/074368.
As-filed PCT Application of PCT/CN2019/074368.
Receipt for the filing of PCT/CN2019/074368.
Notification of Receipt of Search Copy in Chinese (Form PCT/ISA/202) of PCT/CN2019/074368.
Notification of Receipt of Record Copy (Form PCT/IB/301) of PCT/CN2019/074368.
English Abstract of CN106932040A.
English Abstract of CN108458759A.
English Abstract of JP2011158470A.
English Abstract of JPH06201425A.

* cited by examiner

SIGNAL PROCESSING CIRCUIT FOR PROCESSING SIGNALS FROM ULTRASONIC TRANSDUCERS TO OBTAIN DISTANCE BETWEEN TRANSDUCERS

CROSS-REFERENCE TO RELATED APPLICATIONS

This application is a continuation of International Application No. PCT/CN2019/074368, filed on Feb. 1, 2019, the disclosure of which is hereby incorporated by reference in its entirety.

TECHNICAL FIELD

The present application relates generally to a signal processing circuit and provides a related chip, a flow meter and a method.

BACKGROUND

Ultrasonic flow meter is a commonly used flow meter. Flow meters are widely used to detect the flow velocity of fluids. Compared with other types of flow meters, ultrasonic flow meters are advantageous in terms of pressure loss, minimum detectable flow rate and installation cost, among the others; however, the accuracy thereof still needs to be improved, and further improvements and innovations are needed.

BRIEF SUMMARY OF THE INVENTION

One purpose of the present application is directed to a signal processing circuit and a related chip, a flow meter and a method for processing a transducer receiving signal, so as to address the above-mentioned issues.

One embodiment of the present application discloses a signal processing circuit, which is coupled to a first transducer and a second transducer, wherein there is a distance greater than zero between the first transducer and the second transducer, and a fluid having a flow velocity flows sequentially through the first transducer and the second transducer, and the signal processing circuit includes: a first transmitter, coupled to the first transducer; a first receiver, coupled to the first transducer; a second transmitter, coupled to the second transducer; a second receiver, coupled to the second transducer; and a control unit, coupled to the first transmitter, the first receiver, the second transmitter and the second receiver, wherein the control unit is configured to: generate a first signal and determine a first delay time for the first signal passing through the first transmitter and the first transducer to the second transducer and then passing through the second receiver, when the flow velocity is zero; generate a second signal and determine a second delay time for the second signal passing through the second transmitter and the second transducer to the first transducer and then passing through the first receiver, when the flow velocity is zero; obtain a specific factor according to the first delay time and the second delay time; generate a third signal and determine a third delay time for the third signal passing through the first transmitter and the first transducer to the second transducer and then passing through the second receiver, when the flow velocity is a specific flow velocity greater than zero; generate a fourth signal and determine a fourth delay time for the fourth signal passing through the second transmitter and the second transducer to the first transducer and then passing through the first receiver, when the flow velocity is the specific flow velocity; and obtain the distance according to the specific flow velocity, the specific factor, the third delay time and the fourth delay time.

One embodiment of the present application discloses a chip, which includes the above signal processing circuit.

One embodiment of the present application discloses a flow meter, which includes the above signal processing circuit; the above first transducer; and the above second transducer; wherein the signal processing circuit is coupled to the first transducer and the second transducer.

One embodiment of the present application discloses a signal processing method, which is configured to control a first transmitter, a first receiver, a second transmitter and a second receiver, wherein the first transmitter and the first receiver are coupled to a first transducer, the second transmitter and the second receiver are coupled to a second transducer, there is a distance greater than zero between the first transducer and the second transducer, and a fluid having a flow velocity flows sequentially through the first transducer and the second transducer, wherein the signal processing method includes: generating a first signal and determining a first delay time for the first signal passing through the first transmitter and the first transducer to the second transducer and then passing through the second receiver, when the flow velocity is zero; generating a second signal and determining a second delay time for the second signal passing through the second transmitter and the second transducer to the first transducer and then passing through the first receiver, when the flow velocity is zero; obtaining a specific factor according to the first delay time and the second delay time; generating a third signal and determining a third delay time for the third signal passing through the first transmitter and the first transducer to the second transducer and then passing through the second receiver, when the flow velocity is a specific flow velocity greater than zero; generating a fourth signal and determining a fourth delay time for the fourth signal passing through the second transmitter and the second transducer to the first transducer and then passing through the first receiver, when the flow velocity is the specific flow velocity; and obtaining the distance according to the specific flow velocity, the specific factor, the third delay time and the fourth delay time.

The present application provides signal processing circuits and a related chip, a flow meter and a method for processing the transducer receive signal can improve the accuracy of the flow meter.

DETAILED DESCRIPTION

Figure 1:
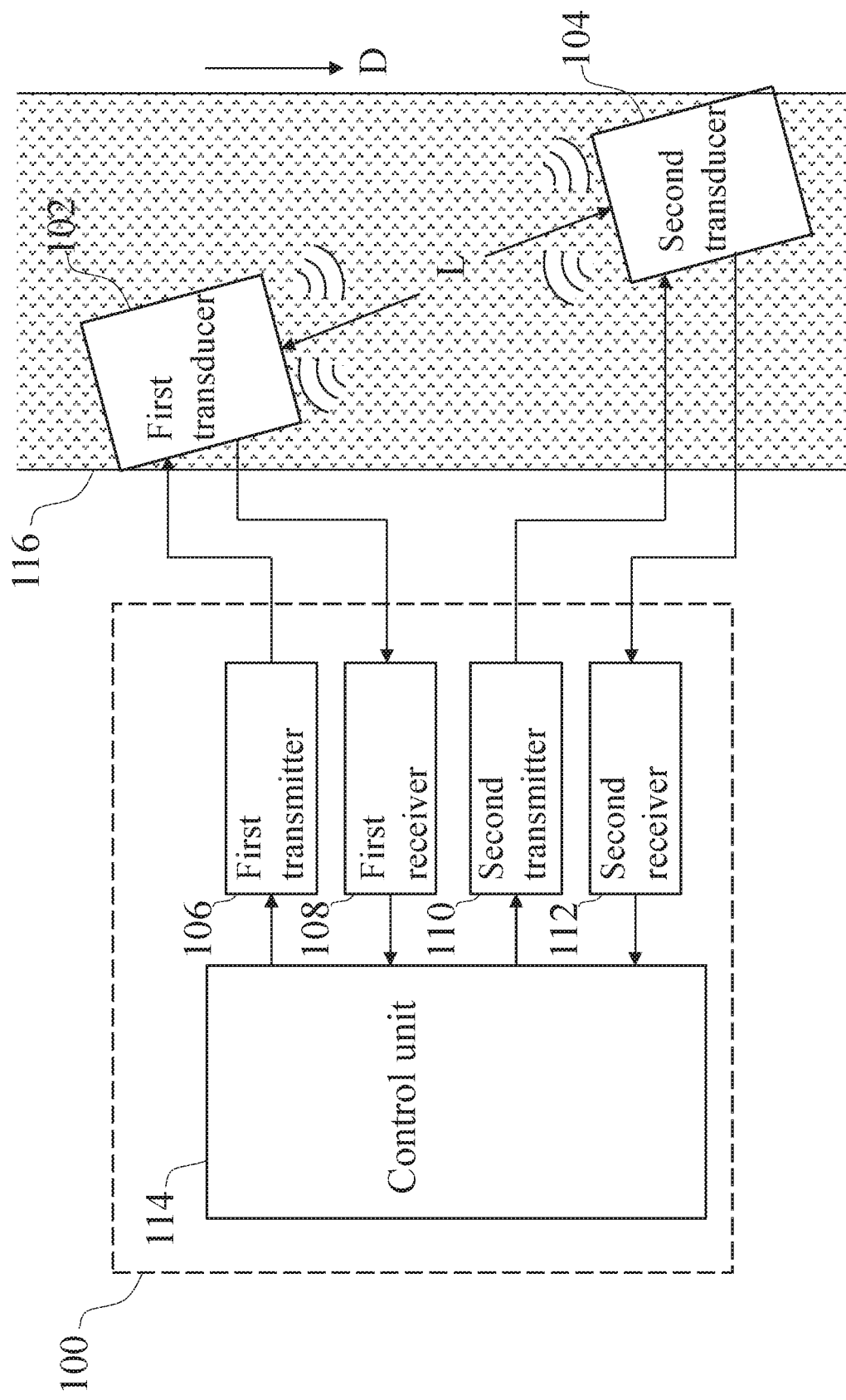
FIG. 1 is a schematic diagram illustrating a signal processing circuit for use in a flow meter, according to embodiments of the present application.

The following disclosure provides many different embodiments, or examples, for implementing different features of the application. Specific examples of components and arrangements are described below to simplify the present disclosure. These are, of course, merely examples and are not intended to be limiting. For example, the formation of a first feature over or on a second feature in the description that follows may include embodiments in which the first and the second features are formed in direct contact, and may also include embodiments in which additional features may be formed between the first and the second features, such that the first and the second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower,"×"above," "upper" and the like, may be used herein for the ease of the description to describe one element or feature's relationship with respect to another element(s) or feature(s) as illustrated in the drawings. The spatially relative terms are intended to encompass different orientations of the device in use or operation in addition to the orientation depicted in the figures. The apparatus may be otherwise oriented (e.g., rotated by 90 degrees or at other orientations) and the spatially relative descriptors used herein may likewise be interpreted accordingly.

Notwithstanding that the numerical ranges and parameters setting forth the broad scope of the application are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. As could be appreciated, other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

When calculating the flow rate, it is critical to determine whether the detected data make sense so as to determine whether there is a need to calibrate the system. In some embodiments, the acoustic speed can be used as the basis for such determination, for example, one can apply the temperature value measured by the temperature sensor to obtain a theoretical acoustic speed, which is then used as a comparison with the current acoustic speed estimated from the actual measurement, so as to monitor whether the ultrasonic flow meter and temperature sensor of the system operate normally.

The present application provides a signal processing circuit 100 configured to calculate a current acoustic speed c and a current temperature T; the present application also provides a chip, which includes the signal processing circuit 100. In some embodiments, the signal processing circuit 100 can be used in a transducer device; for example, the present application also provides a flow meter, which includes the signal processing circuit 100 and a transducer 102. For example, said flow meter can be used to detect flow velocity and/or flow rate of gases or liquids, however, the present application is not limited thereto.

FIG. 1 is a schematic diagram illustrating a signal processing circuit 100 used in a flow meter, according to embodiments of the present application. The signal processing circuit 100 is coupled to a first transducer 102 and a second transducer 104. The transducer is a component capable of transforming energy from one form into another form. These energy forms may include electric energy, mechanic energy, electromagnetic energy, solar energy, chemical energy, acoustic energy and thermal energy, etc.; however, the present application is not limited thereto, and the transducer may include any component capable of transforming energy.

The first transducer 102 and the second transducer 104 are disposed in a pipeline 116, and the transmission direction of the first transducer 102 faces the second transducer 104; the transmission direction of the second transducer 104 faces the first transducer 102. There is a distance L between the first transducer 102 and the second transducer 104, and L is greater than zero. Fluid (such as, liquid or gas) having the flow velocity v flows along the disposition direction D of the pipeline 116 and passes sequentially through the first transducer 102 and the second transducer 104.

The signal processing circuit 100 includes a first transmitter 106 and a first receiver 108, both of which are coupled to a first transducer 102; and a second transmitter 110 and a second receiver 112, both of which are coupled to a second transducer 104. The signal processing circuit 100 further includes a control unit 114 coupled to the first transmitter 106, the first receiver 108, the second transmitter 110 and the second receiver 112. The signal processing circuit 100 is configured to generate a current acoustic speed c and a current temperature T according to the results obtained from the first transducer 102 and the second transducer 104.

Figure 2:
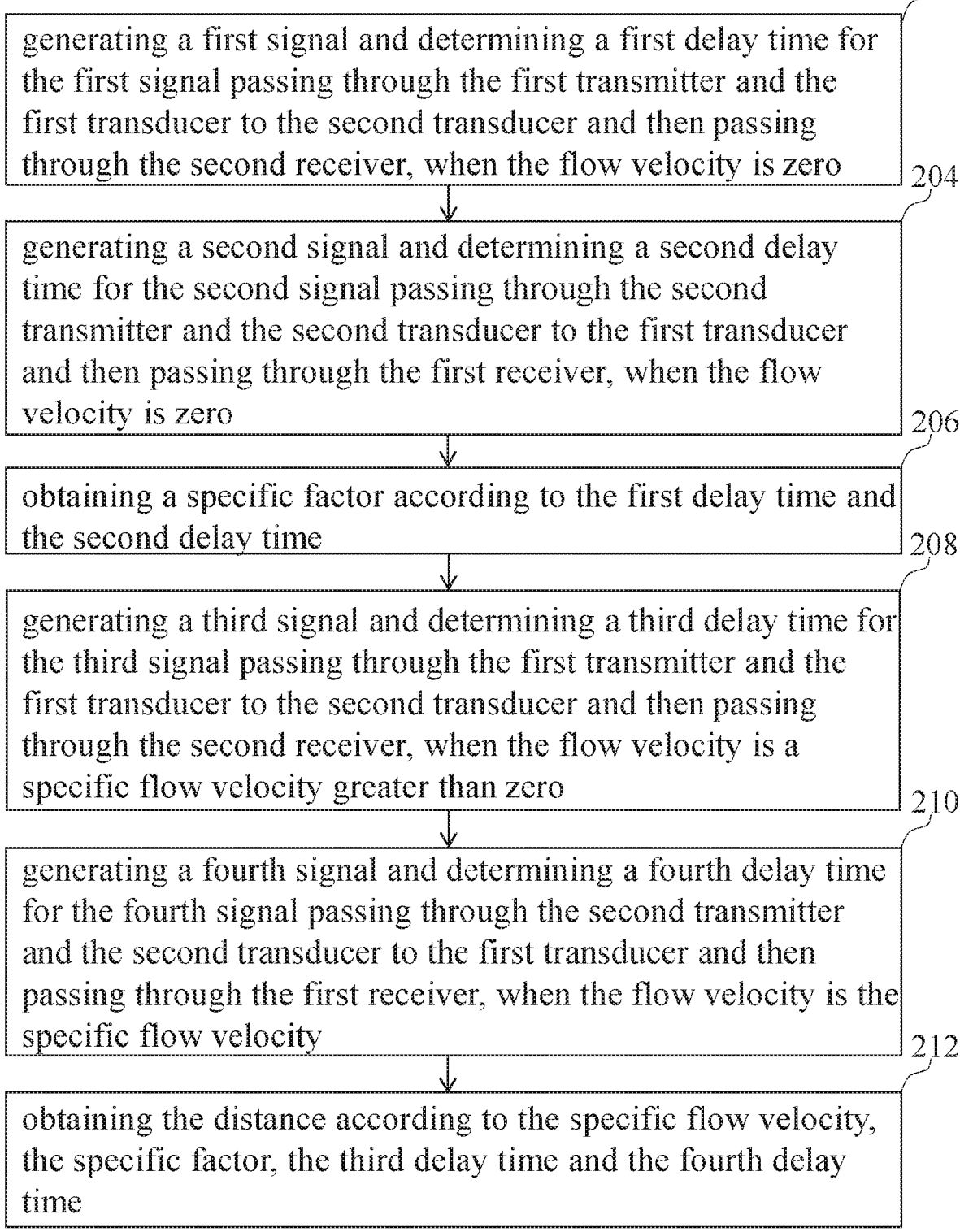
FIG. 2 is a flow diagram illustrating the process that the control unit calculates the distance between a first transducer and a second transducer, according to embodiments of the present application.
Figure 3:
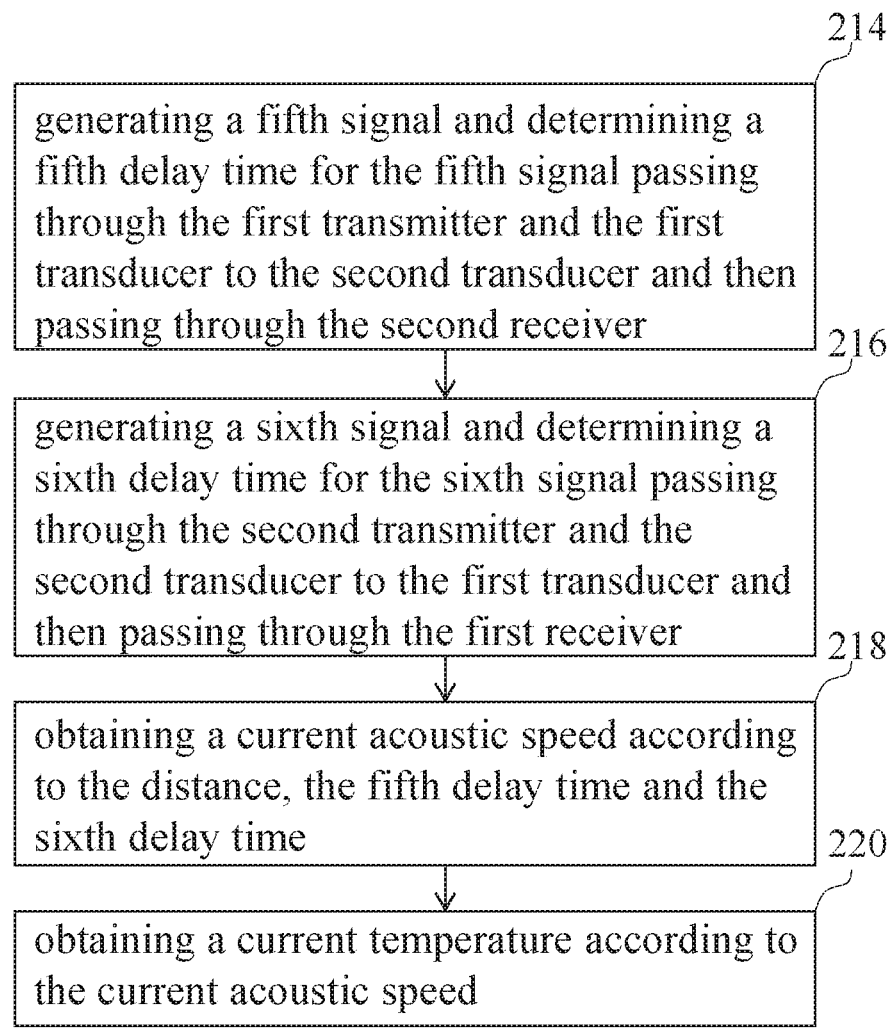
FIG. 3 is a flow diagram illustrating a process that the control unit calculates a current acoustic speed, according to the first embodiment of the present application.

FIG. 2 and FIG. 3 flow diagrams illustrating the process that the control unit 114 calculates a current acoustic speed c according to the first embodiment of the present application. First, during an initializing stage (Step 202 to Step 212 in FIG. 2) of the flow meter, the flow velocity v is controlled, and hence, has a known value; during a general stage (Step 214 to Step 220 in FIG. 3) of the flow meter, the value of the flow velocity v is unknown. In the initializing stage of Step 202 to Step 212, the signal processing circuit 100 is used to obtain the distance L between the first transducer 102 and the second transducer 104. Although the first transducer 102 and the second transducer 104 are disposed in advanced, there might still be some minor deviation of the distance L, and hence, the initializing stage of Step 202 to Step 212 can be used to obtain a more accurate distance L so that in Step 214 to Step 220, it is feasible to estimate the current acoustic speed c and the current temperature T.

In Step 202, the flow velocity v of the fluid in the pipeline 116 is controlled at 0, meaning that the fluid is not flowing. The control unit 114 generates a first signal and determines a first delay time TM12 for the first signal passing through the first transmitter 106 and the first transducer 102 to directly trigger the second transducer 104, and then passing through a second receiver 112, wherein the first delay time TM12 can be expressed using the following equation:

$$TM12 = t_{TX1} + t_{RX12} + t_{12} = t_{TX1} + t_{RX12} + L/c \quad (1)$$

wherein, $t_{TX1}$ is a delay time for the first transmitter 106 and the first transducer 102 transmitting the signal (such as, the first signal), $t_{RX12}$ is the delay time for the signal (such as, the first signal) from the first transmitter 106 being received by the second transducer 104 and the second receiver 112, $t_{12}$ is the time for the signal (such as, the first signal) traveling from the first transducer 102 to the second transducer 104, and c is the current acoustic speed.

Next, in Step 204, the flow velocity v of the fluid in the pipeline 116 is still controlled at zero, and the control unit 114 generates a second signal and determines a second delay time TM21 for the second signal passing through the second transmitter 110 and the second transducer 104 to directly trigger the first transducer 102, and then passing through a first receiver 108, wherein the second delay time TM21 can be expressed using the following equation:

$$TM21 = t_{TX2} + t_{RX21} + t_{21} = t_{TX2} + t_{RX21} + L/c \quad (2)$$

wherein, $t_{TX2}$ is the delay time for the second transmitter 110 and the second transducer 104 transmitting the signal (such as, the second signal), $t_{RX21}$ is the delay time for the signal (such as, the second signal) from the second transmitter 110 being received by the first transducer 102 and the first receiver 108, and $t_{21}$ is the time for the signal (such as, the second signal) traveling from the second transducer 104 to the first transducer 102.

Accordingly, in Step 206, it is feasible to obtain specific factor $t_{TX2} + t_{RX21} - t_{TX1} - t_{RX12}$ by subtracting a first delay time TM12 from the second delay time TM21 for subsequent use.

$$TM21 - TM12 = t_{TX2} + t_{RX21} - t_{TX1} - t_{RX12} \quad (3)$$

Next, in Step 208, the flow velocity v of the fluid is controlled at a specific flow velocity vs that is greater than zero, and the control unit 114 generates a third signal and determines a third delay time $TM12_{vs}$ for the third signal passing through the first transmitter 106 and the first transducer 102 to directly trigger the second transducer 104, and then passing through the second receiver 112, wherein the third delay time $TM12_{vs}$ can be expressed using the following equation:

$$TM12_{vs} = t_{TX1} + t_{RX12} + L/(c+vs) \quad (4)$$

In Step 210, the flow velocity v of the fluid is stilled controlled at the specific flow velocity vs that is greater than zero, and the control unit 114 generates a fourth signal and determines a fourth delay time $TM21_{vs}$ for the fourth signal passing through the second transmitter 110 and the second transducer 104 to directly trigger the first transducer 102, and then passing through the first receiver 108, wherein the fourth delay time $TM21_{vs}$ can be expressed using the following equation:

$$TM21_{vs} = t_{TX2} + t_{RX21} + L/(c-vs) \quad (5)$$

Therefore, equation (6) can be obtained according to equation (4) and equation (5):

$$L \approx 2 \cdot vs \cdot TM12_{vs} \cdot TM21_{vs}/((TM21_{vs} - TM12_{vs}) - (t_{TX2} + t_{RX21} - t_{TX1} - t_{RX12})) \quad (6)$$

Hence, in Step 212, it is feasible to obtain the distance L according to the specific flow velocity vs, the specific factor $t_{TX2} + t_{RX21} - t_{TX1} - t_{RX12}$, the third delay time $TM12_{vs}$ and the fourth delay time $TM21_{vs}$ from the equation (6).

Next, in Step 214, the flow meter enters the general stage, at which time, the flow velocity v is unknown, and the control unit 114 generates a fifth signal and determines a fifth delay time $TM12_v$ for the fifth signal passing through the first transmitter 106 and the first transducer 102 to directly trigger the second transducer 104, and then passing through the second receiver 112, wherein the fifth delay time $TM12_v$ can be expressed using the following equation:

$$TM12_v = t_{TX1} + t_{RX12} + L/(c+v) \quad (7)$$

In Step 216, the control unit 114 generates a sixth signal and determines a sixth delay time $TM21_v$ for the sixth signal passing through the second transmitter 110 and the second transducer 104 to directly trigger the first transducer 102, and then passing through the first receiver 108, wherein the sixth delay time $TM21_v$ can be expressed using the following equation:

$$TM21_v = t_{TX2} + t_{RX21} + L/(c-v) \quad (8)$$

Therefore, equation (9) can be obtained according to equation (7) and equation (8):

$$c \approx (L/2) \cdot (TM12_v + TM21_v)/(TM21_v \cdot TM12_v) \quad (9)$$

Hence, in Step 218, it is feasible to obtain the current acoustic speed c according to the distance L, the fifth delay time $TM12_v$, and the sixth delay time $TM21_v$ from equation (9).

$$c = 331 + 0.6 \cdot T \quad (10)$$

In Step 220, the control unit 114 further obtains the current temperature T according to the current acoustic speed c from equation (10).

Figure 4:
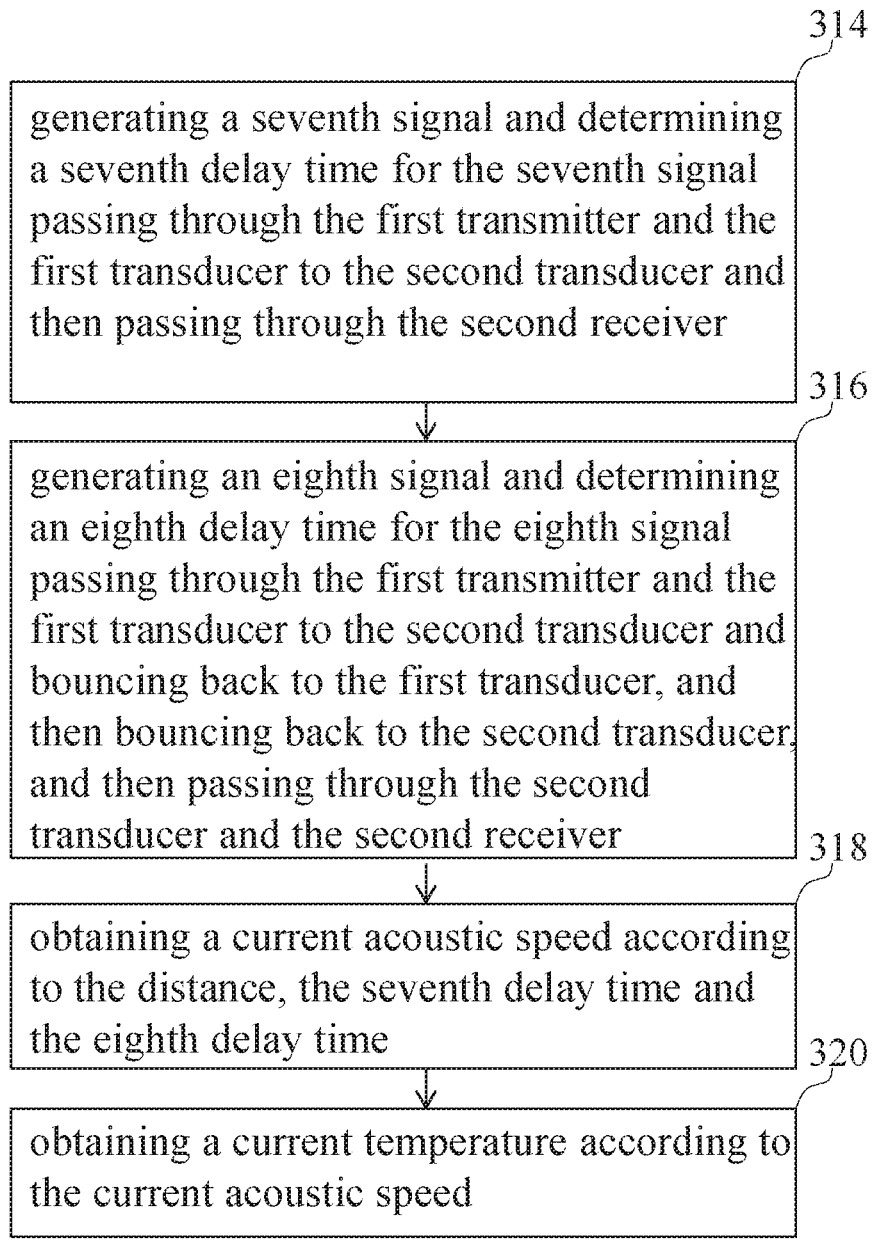
FIG. 4 is a flow diagram illustrating a process that the control unit calculates a current acoustic speed, according to the second embodiment of the present application.

FIG. 4 is a flow diagram illustrating the process that the control unit 114 calculates the current acoustic speed c, according to the second embodiment of the present application. In Step 314 to Step 320 in FIG. 4, the flow meter enters the general stage, at which time the flow velocity v is unknown. Step 314 to Step 320 in FIG. 4 can be used in connection with Step 202 to Step 212 in FIG. 2. In other words, Step 214 to Step 220 in FIG. 3 may replace Step 314 to Step 320 in FIG. 4, so as to estimate the current acoustic speed c and the current temperature T more accurately.

In Step 314, the flow velocity v is unknown, and the control unit 114 generates a seventh signal and determines a seventh delay time $TM12_v$ for a seventh signal passing through the first transmitter 106 and the first transducer 102 to directly trigger the second transducer 104, and then passing through the second receiver 112, wherein the seventh delay time $TM12_v$ can be expressed using the following equation (same as equation (7)):

$$TM12_v = t_{TX1} + t_{RX12} + L/(c+v) \quad (11)$$

In Step 316, the flow velocity v is unknown, and the control unit 114 generates an eighth signal and determines an eighth delay time $TE12_v$ for the eighth signal passing through the first transmitter 106 and the first transducer 102 to the second transducer 104 and bouncing back to the first transducer 102, and then bouncing back to the second transducer 104, and then passing through the second receiver 112, wherein the eighth delay time $TE12_v$ can be expressed using the following equation:

$$TE12_v = t_{TX1} + t_{RX12} + t_{12} + t_{21} + t_{12} = t_{TX1} + t_{RX12} + L/(C+v) + L/(c-v) + L/(C+v) \quad (12)$$

The following equation can be obtained by subtracting equation (11) from equation (12):

$$TE12_v - TM12_v \approx 2*L/c \quad (13)$$

Therefore, in Step 318, the control unit 114 can obtain the current acoustic speed c according to the distance L, the seventh delay time $TM12_v$, and the eighth delay time $TE12_v$, from equation (13).

Subsequently, in Step 320, the control unit 114 further obtain the current temperature T according to the current acoustic speed c from equation (10).

Compared with the acoustic speed c, the flow velocity v is relatively small, and hence, the degree of distortion during the simplification process of equation (13) is less than that of the equation (9), and accordingly, the current acoustic speed c and the current temperature T obtained in Step 314 to Step 320 are more accurate than those obtained in Step 214 to Step 220.

Figure 5:
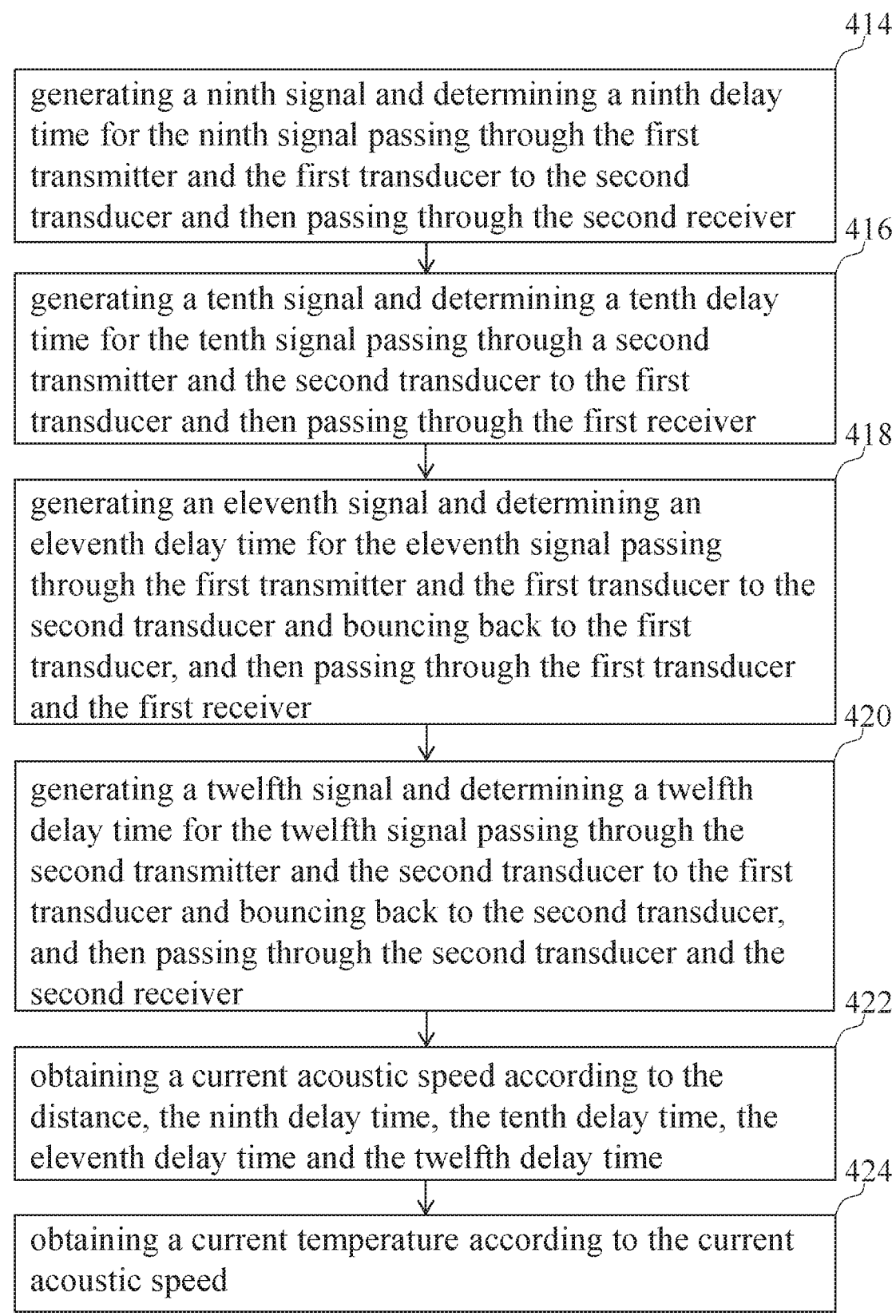
FIG. 5 is a flow diagram illustrating a process that the control unit calculates a current acoustic speed, according to the third embodiment of the present application.

FIG. 5 is a flow diagram illustrating the process that control unit 114 calculates the current acoustic speed c, according to the third embodiment of the present application. In Step 414 to Step 420 in FIG. 5, the flow meter enters a general stage, at which time, the flow velocity v is an unknown value. Step 414 to Step 420 in FIG. 5 can be used in connection with Step 202 to Step 212 in FIG. 2. In other words, Step 214 to Step 220 in FIG. 3 may replace Step 414 to Step 420 in FIG. 5, so as to estimate the current acoustic speed c and the current temperature T more accurately.

In Step 414, the flow velocity v is unknown, and the control unit 114 generates a ninth signal and determines a ninth delay time $TM12_v$ for the ninth signal passing through the first transmitter 106 and the first transducer 102 to directly trigger the second transducer 104, and then passing through the second receiver 112, wherein the ninth delay time $TM12_v$ can be expressed using the following equation (same as equation (7)):

$$TM12_v = t_{TX1} + t_{RX12} + L/(c+v) \quad (14)$$

In Step 416, the control unit 114 generates a tenth signal and determines a tenth delay time $TM21_v$ for the tenth signal passing through the second transmitter 110 and the second transducer 104 to directly trigger the first transducer 102, and then passing through the first receiver 108, wherein the tenth delay time $TM21_v$ can be expressed using the following equation (same as equation (8)):

$$TM21_v = t_{TX2} + t_{RX21} + L/(c-v) \quad (15)$$

In Step 418, the control unit 114 generates an eleventh signal and determines an eleventh delay time $TE11_v$ for the eleventh signal passing through the first transmitter 106 and the first transducer 102 to the second transducer 104, and bouncing back to the first transducer 102, and then passing through the first transducer 102 and the first receiver 108, wherein the eleventh delay time $TE11_v$ can be expressed using the following equation:

$$TE11_v = t_{TX1} + t_{RX11} + t_{12} + t_{21} = t_{TX1} + t_{RX11} + L/(C+) + L/(c-v) \quad (16)$$

wherein $t_{RX11}$ is the delay time of the signal (such as, the eleventh signal) from the first transmitter 106 in the first transducer 102 and the first receiver 108.

In Step 420, the control unit 114 generates a twelfth signal and determines a twelfth delay time $TE22_v$ for the twelfth signal passing through the second transmitter 110 and the second transducer 104 to the first transducer 102 and bouncing back to the second transducer 104, and then passing through the second transducer 104 and the second receiver 112, which can be expressed using the following equation:

$$TE22_v = t_{TX2} + t_{RX22} + t_{21} + t_{12} = t_{TX2} + t_{RX22} + L/(c-v) + L/(c+v) \quad (17)$$

wherein $t_{RX22}$ is the delay time of the signal (such as, the twelfth signal) from the second transmitter 110 in the second transducer 104 and the second receiver 112.

The following equation can be obtained by subtracting equation (14) from equation (16):

$$TE11_v - TM12_v = t_{RX11} - t_{RX12} + L/(c-v) \quad (18)$$

The following equation can be obtained by subtracting equation (15) from equation (17):

$$TE22_v - TM21_v = t_{RX22} - t_{RX21} + L/(c+v) \quad (19)$$

Consequently, the following equation can be obtained according to equation (18) and equation (19):

$$2*L/c \approx TE11_v - TM12_v + TE22_v - TM21_v \quad (20)$$

Hence, in Step 422, the control unit 114 can obtain the current acoustic speed c according to the distance L, the ninth delay time $TM12_v$, the tenth delay time $TM21_v$, the eleventh delay time $TE11_v$, and the twelfth delay time $TE22_v$, from equation (20).

Then, in Step 424, the control unit 114 further obtain the current temperature T according to the current acoustic speed c from equation (10).

The degree of simplification in equation (20) is less than that in equation (9), and therefore, the current acoustic speed c and current temperature T obtained from Step 414 to Step 424 is more accurate than those obtained from Step 214 to Step 220.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A signal processing circuit, wherein the signal processing circuit is coupled to a first transducer and a second transducer, wherein there is a distance greater than zero between the first transducer and the second transducer, and a fluid having a flow velocity flows sequentially through the first transducer and the second transducer, wherein the signal processing circuit comprises:
   a first transmitter, coupled to the first transducer;
   a first receiver, coupled to the first transducer;
   a second transmitter, coupled to the second transducer;
   a second receiver, coupled to the second transducer; and
   a control unit, coupled to the first transmitter, the first receiver, the second transmitter and the second receiver, wherein the control unit is configured to:
   generate a first signal and determine a first delay time for the first signal passing through the first transmitter and the first transducer to the second transducer and then passing through the second receiver, when the flow velocity is zero;
   generate a second signal and determine a second delay time for the second signal passing through the second transmitter and the second transducer to the first transducer and then passing through the first receiver, when the flow velocity is zero;

obtain a specific factor according to the first delay time and the second delay time;

generate a third signal and determine a third delay time for the third signal passing through the first transmitter and the first transducer to the second transducer and then passing through the second receiver, when the flow velocity is a specific flow velocity greater than zero;

generate a fourth signal and determine a fourth delay time for the fourth signal passing through the second transmitter and the second transducer to the first transducer and then passing through the first receiver, when the flow velocity is the specific flow velocity;

obtain the distance according to the specific flow velocity, the specific factor, the third delay time and the fourth delay time;

generate a fifth signal and determine a fifth delay time for the fifth signal passing through the first transmitter and the first transducer to the second transducer and then passing through the second receiver;

generate a sixth signal and determine a sixth delay time for the sixth signal passing through the second transmitter and the second transducer to the first transducer and then passing through the first receiver; and obtain a current acoustic speed according to the distance, the fifth delay time and the sixth delay time.

2. The signal processing circuit of claim 1, wherein the control unit is further configured to obtain a current temperature according to the current acoustic speed.

3. The signal processing circuit of claim 1, wherein the control unit is further configured to obtain the specific factor by subtracting the first delay time from the second delay time.

4. The signal processing circuit of claim 3, wherein the specific factor is a delay time for the second signal passing through the second transmitter and the second transducer, plus a delay time for the second signal passing through the first transducer and the first receiver, minus a delay time for the first signal passing through the first transmitter and the first transducer, and minus a delay time for the first signal passing through the second transducer and the second receiver.

5. A flow meter, comprising:
the signal processing circuit of claim 1;
the first transducer; and
the second transducer;
wherein the signal processing circuit is coupled to the first transducer and the second transducer.

6. A chip, comprising a signal processing circuit coupled to a first transducer and a second transducer, wherein there is a distance greater than zero between the first transducer and the second transducer, and a fluid having a flow velocity flows sequentially through the first transducer and the second transducer, wherein the signal processing circuit comprises:
a first transmitter, coupled to the first transducer;
a first receiver, coupled to the first transducer;
a second transmitter, coupled to the second transducer;
a second receiver, coupled to the second transducer; and
a control unit, coupled to the first transmitter, the first receiver, the second transmitter and the second receiver, wherein the control unit is configured to:

generate a first signal and determine a first delay time for the first signal passing through the first transmitter and the first transducer to the second transducer and then passing through the second receiver, when the flow velocity is zero;

generate a second signal and determine a second delay time for the second signal passing through the second transmitter and the second transducer to the first transducer and then passing through the first receiver, when the flow velocity is zero;

obtain a specific factor according to the first delay time and the second delay time;

generate a third signal and determine a third delay time for the third signal passing through the first transmitter and the first transducer to the second transducer and then passing through the second receiver, when the flow velocity is a specific flow velocity greater than zero;

generate a fourth signal and determine a fourth delay time for the fourth signal passing through the second transmitter and the second transducer to the first transducer and then passing through the first receiver, when the flow velocity is the specific flow velocity;

obtain the distance according to the specific flow velocity, the specific factor, the third delay time and the fourth delay time;

generate a fifth signal and determine a fifth delay time for the fifth signal passing through the first transmitter and the first transducer to the second transducer and then passing through the second receiver;

generate a sixth signal and determine a sixth delay time for the sixth signal passing through the second transmitter and the second transducer to the first transducer and then passing through the first receiver; and obtain a current acoustic speed according to the distance, the fifth delay time and the sixth delay time.

7. A signal processing method, configured to control a first transmitter, a first receiver, a second transmitter and a second receiver, wherein the first transmitter and the first receiver are coupled to a first transducer, the second transmitter and the second receiver are coupled to a second transducer, there is a distance greater than zero between the first transducer and the second transducer, and a fluid having a flow velocity flows sequentially through the first transducer and the second transducer, wherein the signal processing method comprises:

generating a first signal and determining a first delay time for the first signal passing through the first transmitter and the first transducer to the second transducer and then passing through the second receiver, when the flow velocity is zero;

generating a second signal and determining a second delay time for the second signal passing through the second transmitter and the second transducer to the first transducer and then passing through the first receiver, when the flow velocity is zero;

obtaining a specific factor according to the first delay time and the second delay time;

generating a third signal and determining a third delay time for the third signal passing through the first transmitter and the first transducer to the second transducer and then passing through the second receiver, when the flow velocity is a specific flow velocity greater than zero;

generating a fourth signal and determining a fourth delay time for the fourth signal passing through the second transmitter and the second transducer to the first transducer and then passing through the first receiver, when the flow velocity is the specific flow velocity;

obtaining the distance according to the specific flow velocity, the specific factor, the third delay time and the fourth delay time;

generate a fifth signal and determine a fifth delay time for the fifth signal passing through the first transmitter and the first transducer to the second transducer and then passing through the second receiver;

generate a sixth signal and determine a sixth delay time for the sixth signal passing through the second transmitter and the second transducer to the first transducer and then passing through the first receiver; and obtain a current acoustic speed according to the distance, the fifth delay time and the sixth delay time.

8. The signal processing method of claim 7, further comprising:

obtaining a current temperature according to the current acoustic speed.

9. The signal processing method of claim 7, further comprising subtracting the first delay time from the second delay time to obtain the specific factor.

10. The signal processing method of claim 9, wherein the specific factor is a delay time for the second signal passing through the second transmitter and the second transducer, plus a delay time for the second signal passing through the first transducer and the first receiver, minus a delay time for the first signal passing through the first transmitter and the first transducer, and minus a delay time for the first signal passing through the second transducer and the second receiver.

* * * * *